United States Patent
Rengarajan et al.

(10) Patent No.: US 10,341,193 B2
(45) Date of Patent: Jul. 2, 2019

(54) OPTIMIZATION ON MULTIPLE TIMESCALES IN A DISTRIBUTED WI-FI SYSTEM

(71) Applicant: Plume Design, Inc., Palo Alto, CA (US)

(72) Inventors: Balaji Rengarajan, Campbell, CA (US); William McFarland, Portola Valley, CA (US); Aman Singla, Saratoga, CA (US); Sameer Vaidya, Saratoga, CA (US)

(73) Assignee: Plume Design, Inc., Palo Alto, CA (US)

( * ) Notice: Subject to any disclaimer, the term of this patent is extended or adjusted under 35 U.S.C. 154(b) by 300 days.

(21) Appl. No.: 15/462,162

(22) Filed: Mar. 17, 2017

(65) Prior Publication Data

US 2017/0272313 A1 Sep. 21, 2017

Related U.S. Application Data

(60) Provisional application No. 62/310,605, filed on Mar. 18, 2016.

(51) Int. Cl.
*G06F 15/173* (2006.01)
*H04L 12/24* (2006.01)
*H04W 24/02* (2009.01)
*H04W 84/12* (2009.01)
*H04L 12/26* (2006.01)

(52) U.S. Cl.
CPC ........ *H04L 41/142* (2013.01); *H04L 41/0823* (2013.01); *H04L 41/16* (2013.01); *H04W 24/02* (2013.01); *H04L 43/0882* (2013.01); *H04L 43/0894* (2013.01); *H04W 84/12* (2013.01)

(58) Field of Classification Search
USPC ....... 709/203, 206, 217, 219, 223, 224, 226, 709/228, 230, 232, 238; 370/329, 352; 398/129; 290/44
See application file for complete search history.

(56) References Cited

U.S. PATENT DOCUMENTS

| | | | |
|---|---|---|---|
| 7,315,533 B2 | 1/2008 | Theobold et al. | |
| 7,414,978 B2 | 8/2008 | Lun et al. | |
| 7,840,312 B2 * | 11/2010 | Altemark | F03D 7/043 290/44 |
| 7,953,403 B2 | 5/2011 | Nientiedt | |

(Continued)

*Primary Examiner* — Quang N Nguyen
(74) *Attorney, Agent, or Firm* — Clements Bernard Walker PLLC; Lawrence A. Baratta, Jr.

(57) ABSTRACT

Systems and methods for optimizing a distributed Wi-Fi network via a cloud based system using a plurality of control loops over multiple timescales include receiving and storing data measurements associated with operation of the distributed Wi-Fi network; performing one or more of: a fast loop optimization of operating parameters associated with the distributed Wi-Fi network based on one or more first metrics and associated first thresholds; and a slow loop optimization of the operating parameters associated with the distributed Wi-Fi network based on one or more second metrics and associated second thresholds, wherein a timescale of the fast loop optimization is finer than a timescale of the slow loop optimization; and providing the operating parameters to the distributed Wi-Fi network for configuration thereof.

18 Claims, 7 Drawing Sheets

(56) References Cited

U.S. PATENT DOCUMENTS

| | | |
|---|---|---|
| 8,798,021 B2 | 8/2014 | Mangalvedhe et al. |
| 9,060,279 B2 | 6/2015 | Ganu et al. |
| 9,066,251 B2 | 6/2015 | Madan et al. |
| 9,131,391 B2 | 9/2015 | Madan et al. |
| 9,131,392 B2 | 9/2015 | Madan et al. |
| 9,420,528 B2 | 8/2016 | Madan et al. |
| 9,497,700 B2 | 11/2016 | Madan et al. |
| 9,510,214 B1 | 11/2016 | Balasubramaniam et al. |
| 9,516,579 B1 | 12/2016 | Diner et al. |
| 2003/0210680 A1* | 11/2003 | Rao ............... H04L 41/147 370/352 |
| 2006/0024061 A1* | 2/2006 | Wirth ............. H04B 10/1125 398/129 |
| 2006/0258395 A1 | 11/2006 | Cave et al. |
| 2007/0149172 A1 | 6/2007 | Dickinson |
| 2007/0242621 A1 | 10/2007 | Nandagopalan et al. |
| 2009/0257380 A1 | 10/2009 | Meier |
| 2009/0279427 A1 | 11/2009 | Ji et al. |
| 2009/0316585 A1 | 12/2009 | Srinivasan |
| 2009/0323632 A1 | 12/2009 | Nix |
| 2011/0039554 A1 | 2/2011 | Bims |
| 2011/0151886 A1 | 6/2011 | Grayson et al. |
| 2012/0002567 A1 | 1/2012 | Sun et al. |
| 2012/0087268 A1 | 4/2012 | Savoor et al. |
| 2012/0122503 A1 | 5/2012 | Ma et al. |
| 2012/0257585 A1 | 10/2012 | Sydor et al. |
| 2013/0201857 A1 | 8/2013 | Bhargava et al. |
| 2013/0272285 A1 | 10/2013 | Goldsmith et al. |
| 2014/0092765 A1 | 4/2014 | Agarwal et al. |
| 2014/0126410 A1 | 5/2014 | Agarwal et al. |
| 2014/0328190 A1 | 11/2014 | Lord et al. |
| 2016/0057761 A1* | 2/2016 | Panaitopol ......... H04W 72/085 370/329 |
| 2016/0080949 A1 | 3/2016 | Chandrasekhar et al. |
| 2017/0259313 A1* | 9/2017 | Fairlie ................. B21B 1/22 |

* cited by examiner

OPTIMIZATION ON MULTIPLE TIMESCALES IN A DISTRIBUTED WI-FI SYSTEM

CROSS-REFERENCE TO RELATED APPLICATION(S)

The present patent/application claims priority to U.S. Provisional Patent Application No. 62/310,605, filed Mar. 18, 2016, and entitled "OPTIMIZATION ON MULTIPLE TIMESCALES IN A DISTRIBUTED WI-FI SYSTEM," the contents of which are incorporated by reference.

FIELD OF THE DISCLOSURE

The present disclosure generally relates to wireless networking systems and methods. More particularly, the present disclosure relates to optimization on multiple timescales in a distributed Wi-Fi system.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where the range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

BRIEF SUMMARY OF THE DISCLOSURE

In an exemplary embodiment, a method for optimizing a distributed Wi-Fi network via a cloud based system using a plurality of control loops over multiple timescales includes receiving and storing data measurements associated with operation of the distributed Wi-Fi network; performing one or more of: a fast loop optimization of operating parameters associated with the distributed Wi-Fi network based on one or more first metrics and associated first thresholds; and a slow loop optimization of the operating parameters associated with the distributed Wi-Fi network based on one or more second metrics and associated second thresholds, wherein a timescale of the fast loop optimization is finer than a timescale of the slow loop optimization; and providing the operating parameters to the distributed Wi-Fi network for configuration thereof. The slow loop optimization can be based on long term trends observed in the stored data measurement and the fast loop optimization can be based on short term fluctuation observed in the received data measurements. The slow loop optimization can be based on forecasts based on the stored data measurement of a plurality of traffic loads, capacities between access points, capacities between access points and clients, interference, and channel availability.

The slow loop optimization can be performed with clustering the distributed Wi-Fi network with one or more Wi-Fi networks proximate thereto and the fast loop optimization can be localized to one of the distributed Wi-Fi network or a cluster that is smaller than used for the slow loop optimization. The slow loop optimization can provide output for the operating parameters in one of a single network configuration and a schedule of network configurations for use at different times. The fast loop optimization addresses conditions on timescales of seconds to minutes. The one or more first metrics can be a different subset of the data measurements than the one or more second metrics. The providing for the slow loop optimization can be performed when load in the distributed Wi-Fi network is low and wherein the providing for the fast loop optimization can be performed after the fast loop optimization is performed. The first associated thresholds can be different from the second associated thresholds.

In another exemplary embodiment, a cloud based system configured to optimize and manage one or more distributed Wi-Fi networks using a plurality of control loops over multiple timescales includes a network interface communicatively coupled to the one or more distributed Wi-Fi networks; one or more processors communicatively coupled to the network interface; and memory storing instructions that, when executed, cause the one or more processors to: receive and store data measurements associated with operation of the distributed Wi-Fi network; perform one or more of: a fast loop optimization of operating parameters associated with the distributed Wi-Fi network based on one or more first metrics and associated first thresholds; and a slow loop optimization of the operating parameters associated with the distributed Wi-Fi network based on one or more second metrics and associated second thresholds, wherein a timescale of the fast loop optimization is finer than a timescale of the slow loop optimization; and provide the operating parameters to the distributed Wi-Fi network for configuration thereof. The slow loop optimization can be based on long term trends observed in the stored data measurement and the fast loop optimization can be based on short term fluctuation observed in the received data measurements.

The slow loop optimization can be based on forecasts based on the stored data measurement of a plurality of traffic loads, capacities between access points, capacities between access points and clients, interference, and channel availability. The slow loop optimization can be performed with clustering the distributed Wi-Fi network with one or more Wi-Fi networks proximate thereto and the fast loop optimization can be localized to one of the distributed Wi-Fi network or a cluster that is smaller than used for the slow loop optimization. The slow loop optimization can provide output for the operating parameters in one of a single network configuration and a schedule of network configurations for use at different times. The fast loop optimization addresses conditions on timescales of seconds to minutes. The one or more first metrics can be a different subset of the data measurements than the one or more second metrics. The operating parameters for the slow loop optimization can be provided when load in the distributed Wi-Fi network is low and wherein the operating parameters for the fast loop optimization can be provided after the fast loop optimization is performed. The first associated thresholds can be different from the second associated thresholds.

In a further exemplary embodiment, a non-transitory computer readable medium stores instructions configured to perform an optimization of one or more distributed Wi-Fi networks using a plurality of control loops over multiple timescales, wherein the instructions, when executed, cause one or more processors to perform steps of: receiving and storing data measurements associated with operation of the distributed Wi-Fi network; performing one or more of: a fast loop optimization of operating parameters associated with the distributed Wi-Fi network based on one or more first metrics and associated first thresholds; and a slow loop optimization of the operating parameters associated with the distributed Wi-Fi network based on one or more second metrics and associated second thresholds, wherein a timescale of the fast loop optimization is finer than a timescale of the slow loop optimization; and providing the operating parameters to the distributed Wi-Fi network for configuration thereof. The slow loop optimization can be based on long term trends observed in the stored data measurement and the fast loop optimization can be based on short term fluctuation observed in the received data measurements.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

Distributed Wi-Fi system

Figure 1:
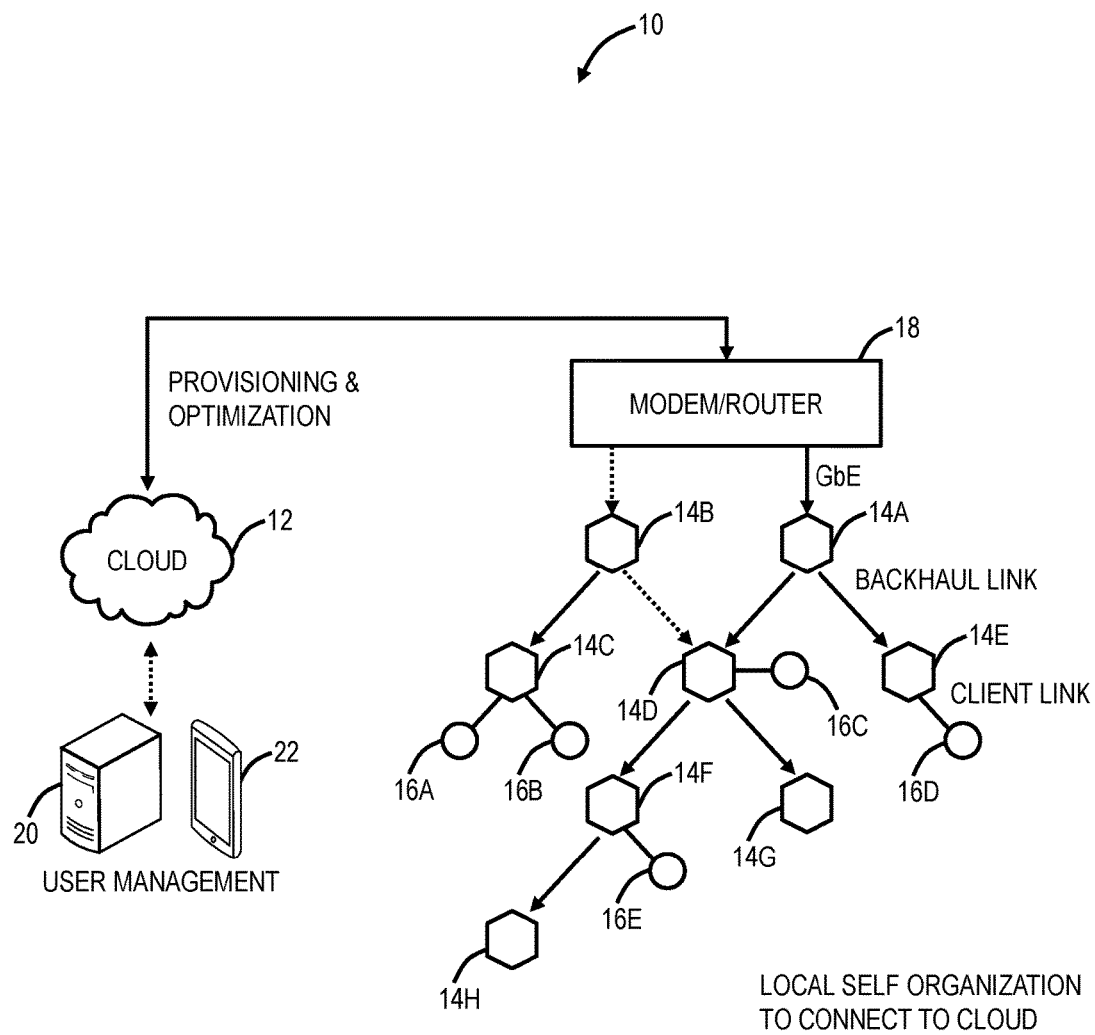
FIG. 1 is a network diagram of a distributed Wi-Fi system with cloud-based control.

Referring to FIG. 1, in an exemplary embodiment, a network diagram illustrates a Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
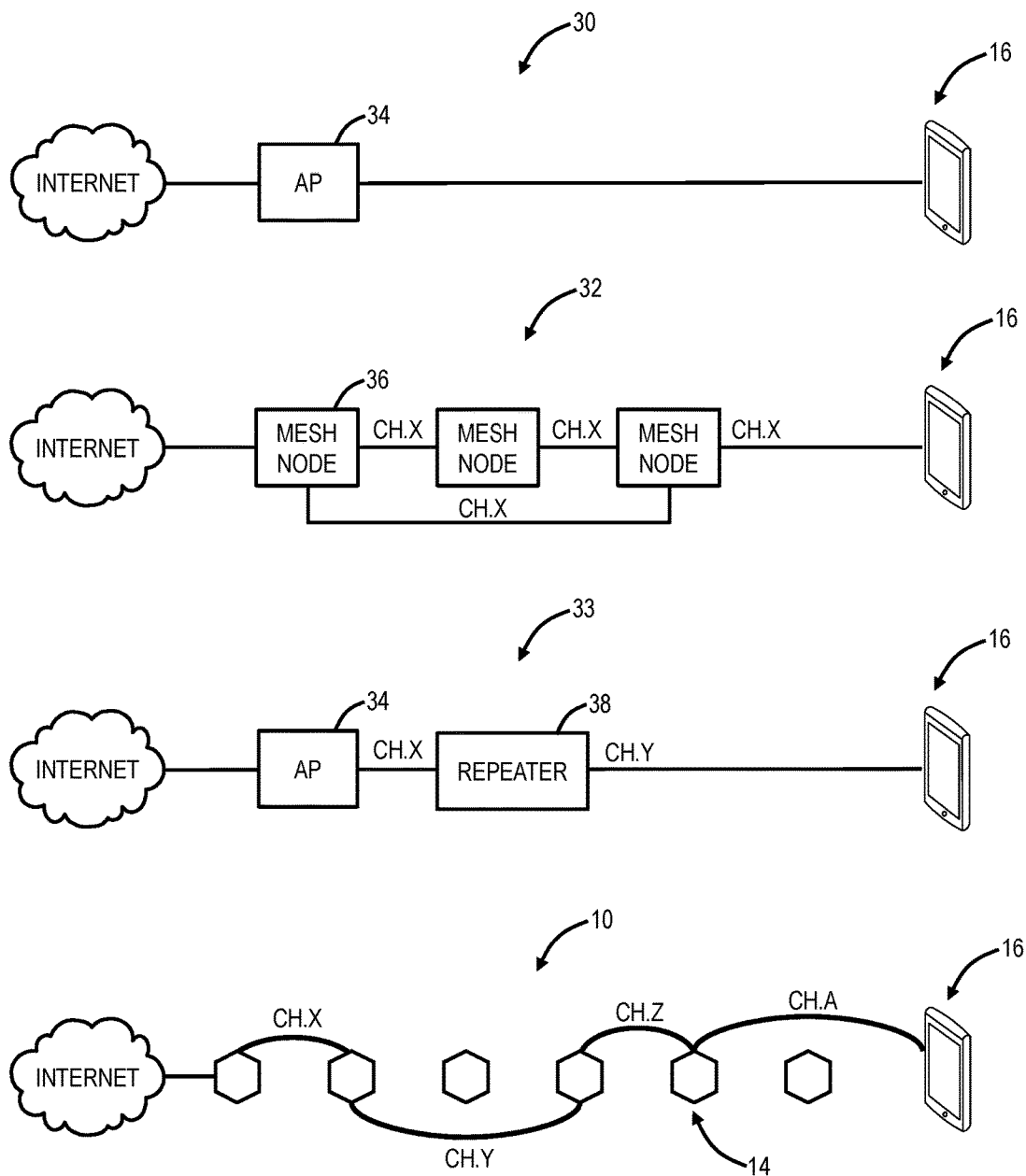
FIG. 2 is a network diagram of differences in operation of the distributed Wi-Fi system of FIG. 1 relative to a conventional single access point system, a Wi-Fi mesh network, and a Wi-Fi repeater system.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Configuration and Optimization Process for the Distributed Wi-Fi System

Figure 3:
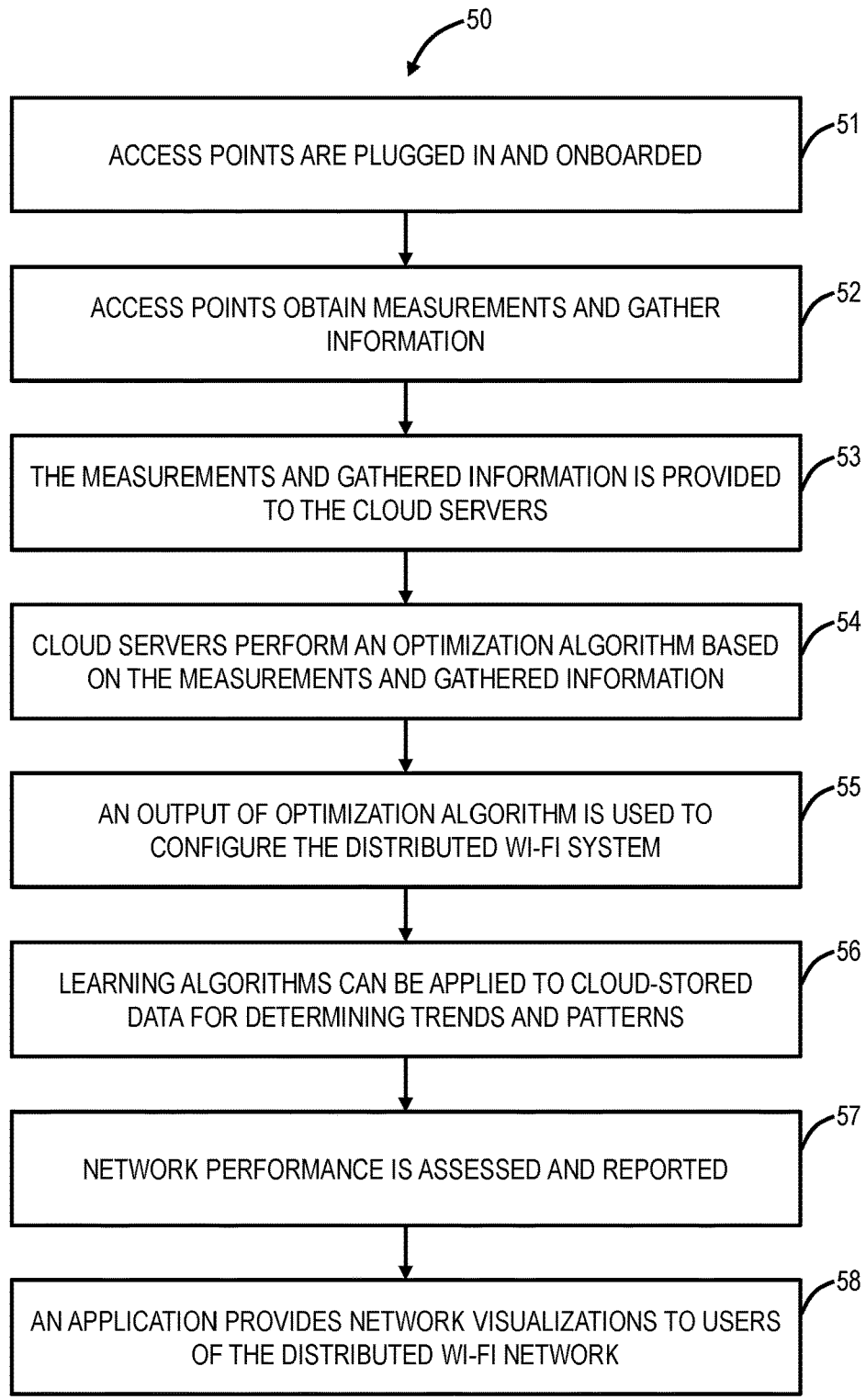
FIG. 3 is a flowchart of a configuration and optimization process for the distributed Wi-Fi system of FIG. 1.

Referring to FIG. 3, in an exemplary embodiment, a flowchart illustrates a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an exemplary embodiment, the onboarding step 51 is performed with Bluetooth or equivalent connectivity between the access point 14 and a user device 22 allowing a user to provide the SSID, security keys, etc. Once onboarded, the access point 14 can initiate communication with the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an exemplary embodiment. Those skilled in the art will recognize the configuration and optimization process 50 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Referring to FIG. 3, in an exemplary embodiment, a block diagram illustrates inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
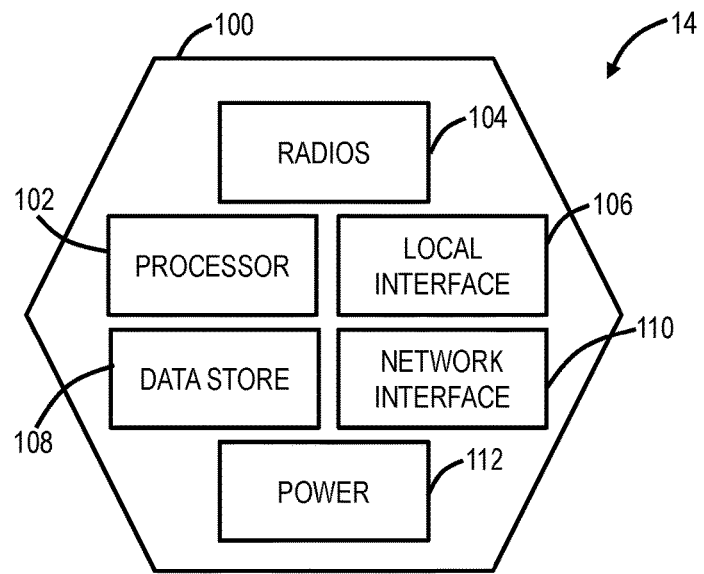
FIG. 5 is a block diagram of functional components of the access point in the distributed Wi-Fi system of FIG. 1.

Referring to FIG. 5, in an exemplary embodiment, a block diagram illustrates functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data.

The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10 BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 6:
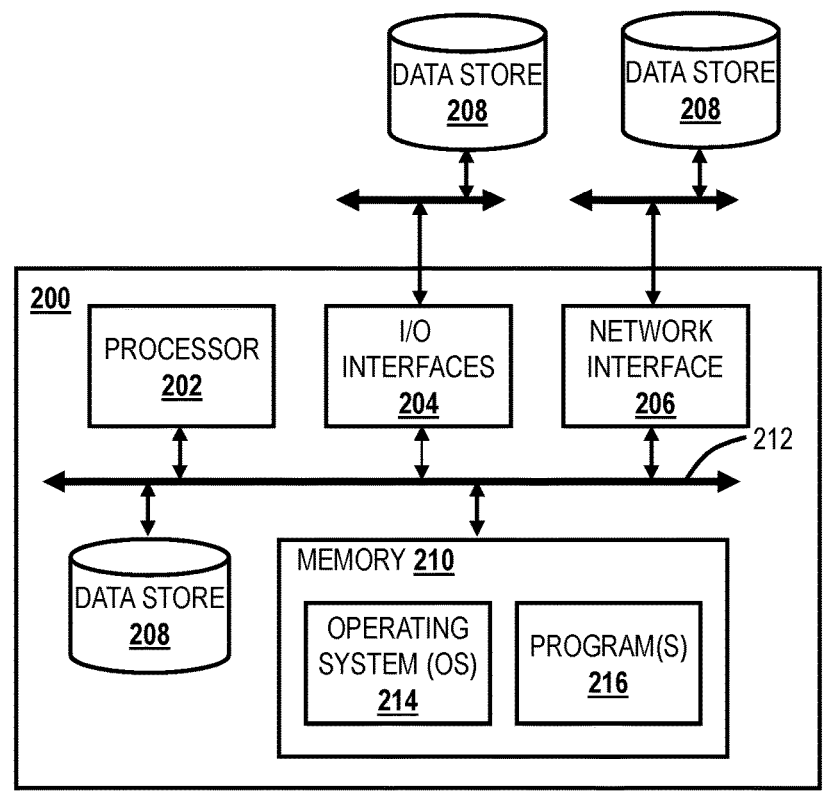
FIG. 6 is a block diagram of functional components of a server, a Wi-Fi client device, or a user device which may be used with the distributed Wi-Fi system of FIG. 1.

Referring to FIG. 6, in an exemplary embodiment, a block diagram illustrates functional components of the server 20, the Wi-Fi client device 16, or the user device 22 which may be used with the distributed Wi-Fi system 10. FIG. 6 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Optimization of Distributed Wi-Fi Networks

Again, the optimization 70 receives inputs from the distributed Wi-Fi network, performs optimization, and provides outputs including operational parameters for the distributed Wi-Fi network. The inputs can include a plurality of traffic loads required by each Wi-Fi client device, the data rate for each possible link, packet error rates on each link, strength and load on in network interferers, and strength and load on out of network interferers. The outputs can include a plurality of channel and bandwidth (BW) selection, routes, and topology, Request to Send/Clear to Send (RTS/CTS) settings, Transmitter (TX) power, clear channel assessment, client association steering, band steering, Arbitration interframe spacing (AIFS), and Wi-Fi contention windows. The optimization can be based on the inputs to maximize an objective function which maximizes excess capacity for a load ratio considering a load desired by each Wi-Fi client device, and the outputs can include operational parameters for the Wi-Fi network based on the optimization.

Figure 4:
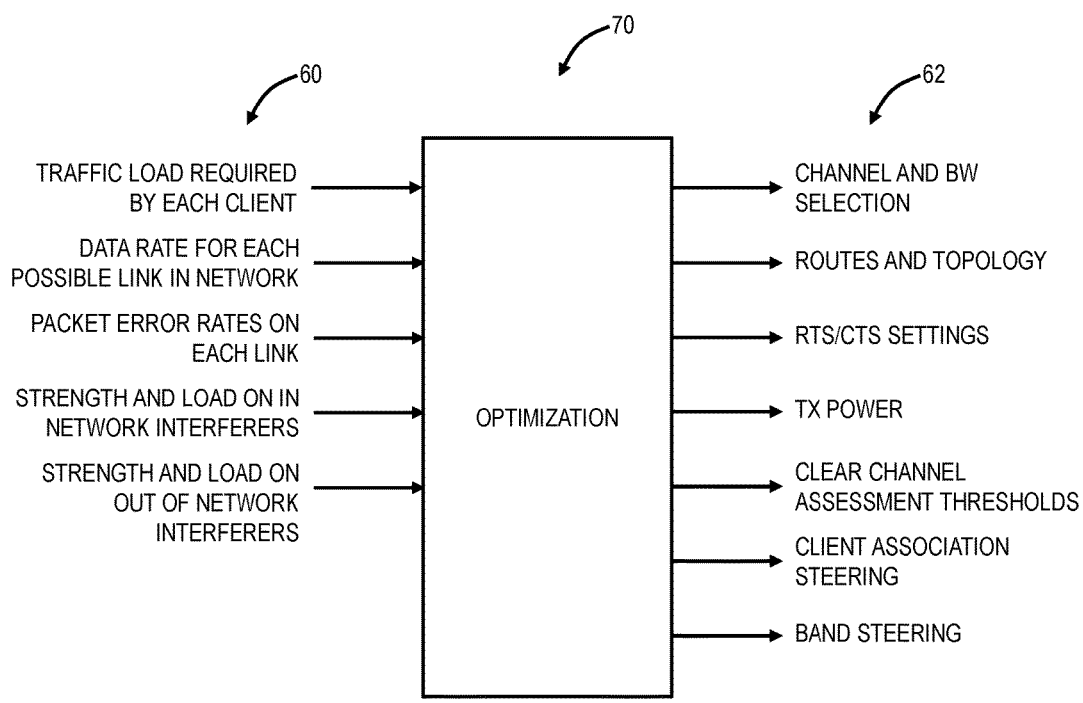
FIG. 4 is a block diagram of inputs and outputs to an optimization as part of the configuration and optimization process of FIG. 3.

Again, referring back to FIG. 4, the optimization 70 takes as inputs 60 measurements that are made by each of the access points 14 deployed throughout a location. These measurements could include, but are not limited to, the traffic load required by each client 16, the data rate that can be maintained between each of the access points 14 and from each of the access points 14 to each of the clients 16, the packet error rates in the links between the access points 14 and between the access points 14 and the clients 16, etc. In addition, the access points 14 make measurements of the interference levels affecting the distributed Wi-Fi system 10. This includes interference from other cloud controlled distributed Wi-Fi systems 10 ("in-network interferers"), and interference coming from devices that are not part of the controllable network ("out-of-network interferers"). It is important to make a distinction between these types of interferers. In-network interferers can be controlled by the cloud service, and therefore can be included in a large optimization over all in-network systems. Out of network interferers cannot be controlled by the cloud service, and therefore their interference cannot be moved to another channel or otherwise changed. The distributed Wi-Fi system 10 must adapt around them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc. A capacity for each link can be derived by examining the amount of data that has been moved (the load), and the amount of time that the transmitter was attempting to transmit. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Another important input is the delay of packets traversing the distributed Wi-Fi system 10. These delays could be derived from direct measurements, time stamping packets as they arrive into the distributed Wi-Fi system 10 at the gateway access point 14 (connected to the modem/router 18), and measuring the elapsed time as they depart at the access point 14. However, such measurement would require some degree of time synchronization between the access points 14. Another approach would be to measure the statistics of delay going through each access point 14 individually. The average total delay through the distributed Wi-Fi system 10, and the distribution of the delays given some assumptions could then be calculated based on the delay statistics through each access point 14 individually. Delay can then become a parameter to be minimized in the optimization 70. It is also useful for the optimization 70 to know the time that each access point 14 spends transmitting and receiving. Together with the amount of information transmitted or received, this can be used to determine the average data rate the various links are sustaining.

The outputs 62 of the optimization 70 are the operational parameters for the distributed Wi-Fi system 10. This includes the frequency channels on which each of the access points 14 are operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization 70 tries to use the lowest possible channel bandwidth for each link that will support the load required by the various user's applications. By using the narrowest sufficient throughput channels, the maximum number of non-interfering channels are left over for other links within the distributed Wi-Fi system 10.

Another set of outputs 62 of the optimization 70 defines the topology of the distributed Wi-Fi system 10, meaning which access points 14 connect to which other access points 14. The actual route through the distributed Wi-Fi system 10 between two clients or the client and the interne gateway (the modem/router 18) is also an output of the optimization 70. Again, the optimization 70 attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the distributed Wi-Fi system 10. The method of optimizing described later takes all this into account and comes up with the truly optimal arrangement.

The optimization 70 can also decide which links within the distributed Wi-Fi system 10 should use RTS/CTS protocols to prevent problems with hidden nodes and can adjust each access point's 14 transmit power level. Higher transmit power increases the data rate and throughput for links from that access point 14, but creates more interference to other access points 14 in the distributed Wi-Fi system 10 and to neighboring systems. Closely associated with changing the transmit power, the optimization 70 can also set the clear channel assessment threshold at which it either defers to traffic on the airwaves or goes ahead and transmits on top of other transmissions. This is effectively a way to ignore transmissions from a neighboring network and not delay transmissions when conditions allow us to transmit on top of those other signals.

A large benefit in system performance can be obtained if the optimization 70 is allowed to choose which access points 14 each Wi-Fi client device 16 connects to in the home. This ability helps with several issues. First, Wi-Fi client devices 16 often do a poor job of roaming from an access point 14 they have been connected to, to an access point 14 that they may have moved closer to. These "sticky" clients will experience unnecessarily low throughput as they attempt to communicate with an access point 14 that is too far away. Another advantage to controlling client associations is to avoid congestion at particular access points 14 in the distributed Wi-Fi system 10. For example, all the Wi-Fi client devices 16 in the home might be located closest to one particular access point 14. Their throughput would be limited by the sharing of the total capacity of that one access point 14. In this case, it would work better to force some of the Wi-Fi client devices 16 to associate with different access points 14, even if those access points 14 are somewhat farther away. The capacity at each access point 14 is now shared among fewer Wi-Fi client devices 16, allowing higher throughputs to each. Yet another reason to move Wi-Fi client devices 16 is to relieve congestion in the backhaul links. It is possible that even if the Wi-Fi client devices 16 spread themselves nicely between access points 14, all of those access points 14 may, in turn, connect to a single access point 14 in the backhaul. In this case, the congestion will be in the backhaul. Again, moving the Wi-Fi client devices 16 to other access points 14, that have a different path through the backhaul can relieve the congestion.

Closely related to steering where Wi-Fi client devices 16 associate, is steering which frequency band they connect on. In many systems and the preferred implementation, the access points 14 can operate simultaneously in more than one frequency band. For example, some access points 14 can operate in the 2.4 GHz and 5 GHz bands simultaneously.

The optimization 70 generates the outputs 62 from the inputs 60 as described herein by maximizing an objective function. There are many different possible objective functions. One objective could be to maximize the total throughput provided to all the Wi-Fi client devices 16. This goal has the disadvantage that the maximum total throughput might be achieved by starving some Wi-Fi client devices 16 completely, in order to improve the performance to Wi-Fi client devices 16 that are already doing well. Another objective could be to enhance as much as possible the performance for the Wi-Fi client devices 16 in the network in the worst situation (maximize the minimum throughput to a Wi-Fi client device 16). This goal helps promote fairness, but might trade a very large amount of total capacity for an incremental improvement at the worst Wi-Fi client device 16.

Optimization of Distributed Wi-Fi Networks over Multiple Timescales

Figure 7:
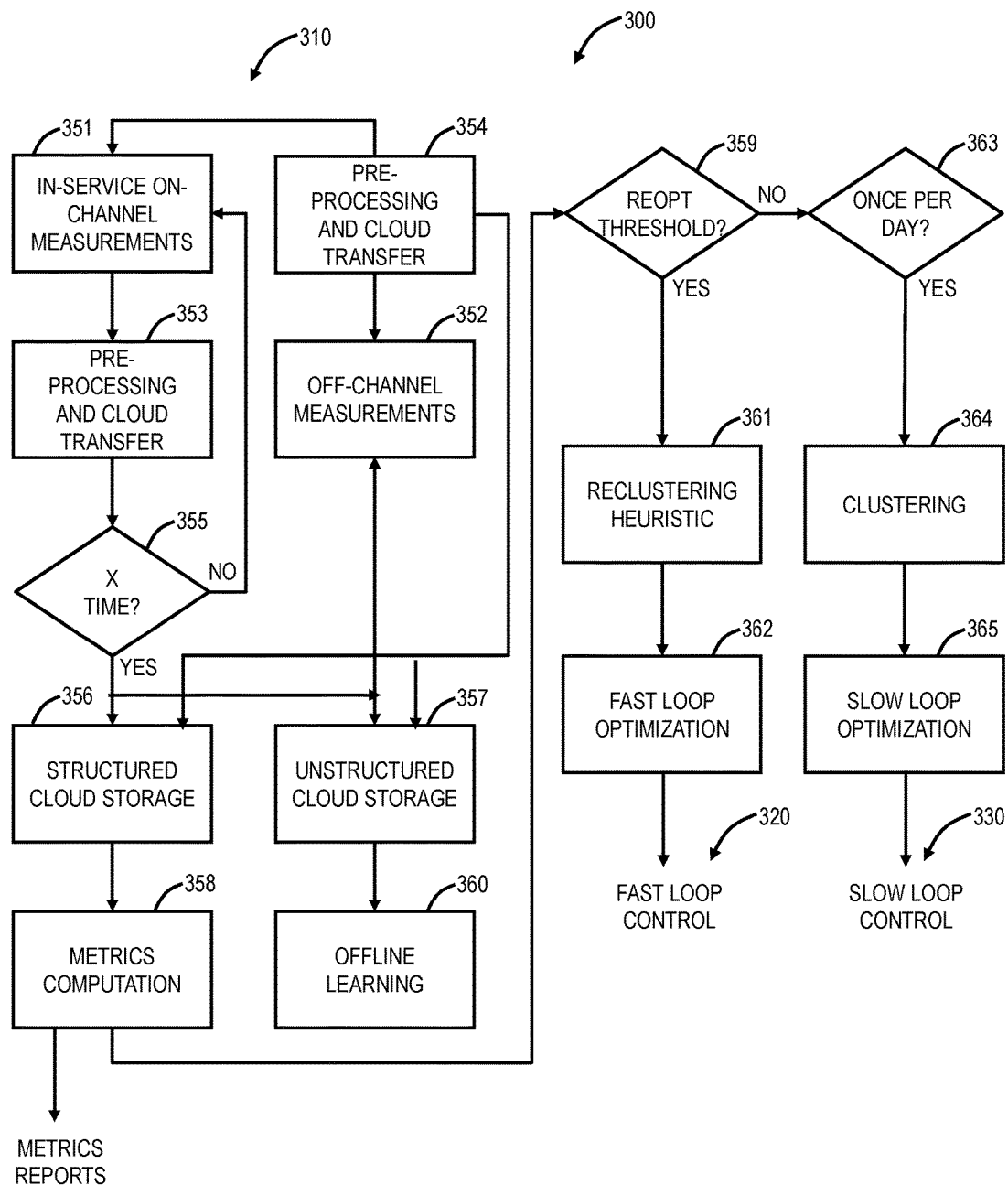
FIG. 7 is a flowchart of an optimization method for a distributed Wi-Fi network performed over multiple timescales.
Figure 8:
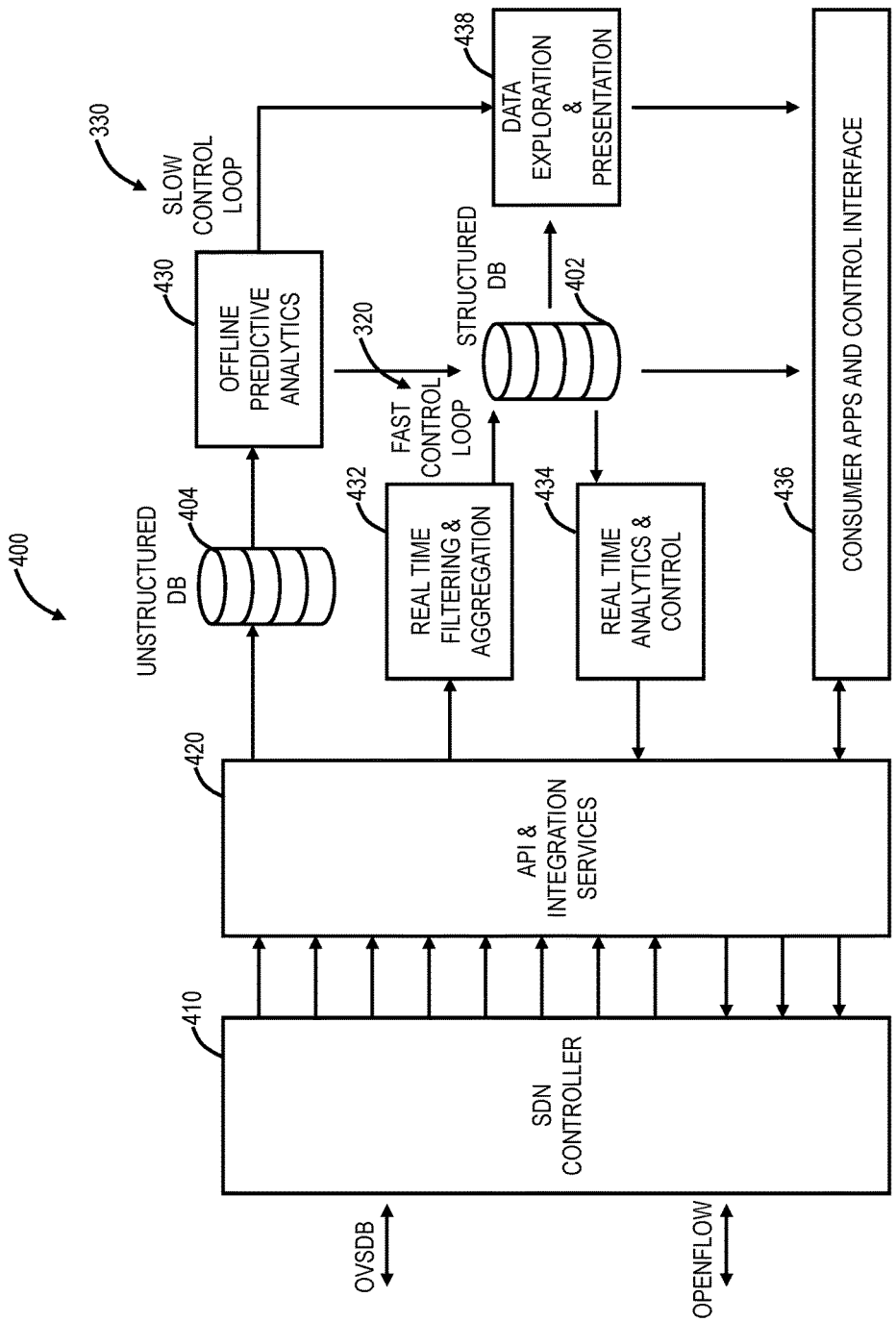
FIG. 8 is a block diagram of a cloud system for implementing the slow and fast control loops associated with the optimization.

Referring to FIG. 7, in an exemplary embodiment, a flowchart illustrates an optimization method 300 for a distributed Wi-Fi network performed over multiple timescales. Referring to FIG. 8, in an exemplary embodiment, a block diagram illustrates a cloud system 400 for implementing the slow and fast control loops associated with the optimization 300. The optimization method 300 contemplates operation by the cloud system 400 (i.e., a cloud service, cloud controller, etc.) to optimize any distributed Wi-Fi network. Again, a distributed Wi-Fi network can include the distributed Wi-Fi system 10, the Wi-Fi mesh network 32, the Wi-Fi repeater network 33, etc. As described herein, the distributed Wi-Fi network includes multiple interconnected nodes in a topology which can be adjusted based on the optimization 70. The topology is formed by a plurality of backhaul links which wirelessly connect the access points 14 to one another. The optimization 70 can be performed periodically to determine an optimal topology in terms of node connectivity, radio (2.4G/5G), channel, channel width, etc.

The optimization method 300 includes data collection steps 310, a fast control loop 320, and a slow control loop 330. The optimization method 300 performs the optimization 70 over multiple timescales including proactive long-term optimization (the slow loop control 330) and short-term optimization (the fast loop control 320). The slow loop control 330 is performed periodically. One advantage to the slow optimization loop is that its result does not need to be applied immediately. Rather, the result of the slow loop optimization can be applied at times when the load on the Wi-Fi network is low. Further, the slow loop optimization itself can be performed on a scheduled basis or delayed until it is convenient to do the optimization. For example, the optimization could be delayed until the load on compute resources is lower, or compute costs are lower. The long-term optimization in the slow loop control 330 is based on trend behavior that does not fluctuate rapidly. The long-term optimization in the slow loop control 330 is complemented by the short-term optimization (the fast loop control 330) that adapts the Wi-Fi network to fluctuations around the long-term forecasts on finer timescales. An advantage to the short-term optimization is that it can be in reaction to quickly changing network conditions, and therefore can be applied very soon after the optimization is completed. The fast loop control 320 and the slow control loop 330 can use different objective function weightings regarding an amount of disruption to the Wi-Fi network a particular new set of network parameters would cause.

The data collection steps 310 include in-service on-channel measurements 351 where the access points 14 collect measurements and statistics on the home channel on which it is operating and off-channel measurements 352 where the access points 14 can periodically switch off of the home channel and measure other channels (i.e., channels other than the home channel). The data collection steps 310 can include pre-processing of the data and cloud transfer (steps 353, 354) where the data (measurements, statistics, etc.) are provided from the access points 14 to the cloud system 400. The measurements can be obtained periodically (step 355).

The measurements can be stored in the cloud system 400 in structured cloud storage in a structured database 402 (step 356) and in unstructured cloud storage in an unstructured database 404 (step 357). The structured cloud storage can be used to compute metrics (step 358) which can be reported and/or used to determine a re-optimization threshold (step 359). The unstructured storage can be used for offline learning (step 360) such as using big data analytics, machine learning, etc.

The re-optimization threshold (step 359) determines if the metrics indicate the Wi-Fi network needs to be re-optimized now based on fast changing conditions, i.e., for the fast loop control 320. If so, a reclustering heuristic may be used (step 361) for fast loop optimization (step 362). Periodically, such as once per day (step 363), clustering (step 364) may be performed for the slow loop optimization (step 365). The clustering step balances the benefits of keeping the number of devices to be jointly optimized small, and the disadvantages of optimizing neighboring portions of the network separately, degrading the ability to reach an overall optimum when considering all devices within a physical region.

The long-term optimization could be triggered simply on the basis of time of a time period being reached. For example, it might be triggered once per day, in the middle of the night, when both more compute loads for the optimization are lower, and any disruption in deploying the results of the optimization into the user's network will be less disruptive. The long-term optimization could also be triggered by measurements crossing any type of threshold similar to some of the methods for triggering short term optimizations. However, the long-term optimization thresholds might be different. The short-term optimizations are undesirable to trigger too often, as they run immediately and create potential computing load and disruption repeatedly. However, the long-term optimizations, if constrained to running only occasionally and at convenient times, are much less desirable. Therefore, the triggers that might queue a long-term optimization for later can be tighter, ensuring that the network is driven closer to its true optimum state over a period of time.

The long-term optimization (the slow loop control 330) could be driven by the history and forecasts of: network traffic, capacities between access points 14, capacities between access points 14 and Wi-Fi client devices 16, channel availability, etc. for several hours into the future. The forecasts could include characterizations of peak periods, statistics of client capacities and channel business obtained from historical data spanning weeks to months. The long-term optimization could be carried out across several neighboring homes that are grouped together based on the high levels of impact that activity at a home has on performance at neighboring homes (i.e., clustering). The output of the long-term optimization could be in the form of a single network configuration or a schedule of network configurations that identifies the configuration to use for different segments of time.

The short-term optimization (the fast loop control 320) adapts to fluctuations in the network traffic load and interference conditions on the timescales of tens of seconds to several minutes. The optimization could be triggered by detecting shifts in network conditions or degradation in performance using filtered, aggregated short-term data or when deviations from the long-term forecasts are observed, based on the metrics. The fast loop control 320 is driven by forecasts over short time horizons based on measurements collected in the recent past as well as long-term historical data and the results of the slow loop control 330. The fast loop control 320 could be more localized than the slow loop control 330, and could be carried out to determine the configuration of a single home or a smaller group of homes (reclustering heuristic) in order to reduce computation time and enable near real-time control of the network. However, the fast loop control 320 could take into account the impact of any changes on the larger cluster of homes used in the slow loop control 330.

It is not necessary that the network parameters optimized as part of the fast loop control 320 be identical to the slow loop control 330. The fast loop control 320 could consider a subset of the parameters to make the computation and control more efficient or consider other parameters that are not set by the slow loop control 330. For example, the fast loop control 320 can focus on channel assignments and channel bandwidth as opposed to topology changes. The fast loop control 320 could also take into account the overhead and disruption imposed in changing the network configuration during a busy period. Different configuration changes could be assigned costs that vary based on the control operations, and the optimization could find a new configuration that balances the performance improvement achieved with the cost of transitioning to the new configuration.

FIG. 8 illustrates the cloud based system 400. In an exemplary embodiment, the cloud based system 400 can include a Software Defined Networking (SDN) controller 410 with OpenFlow interfaces and Open vSwitch Database Management Protocol (OVSDB) interfaces. The SDN controller 410 can connect with Application Programming Interfaces (APIs) and services 420. The unstructured database 404 can connect to the APIs and services 420 and to an offline predictive analytics service 430 which can be configured to implement the slow control loop 330. A real-time filtering and aggregation service 432 can connect to the APIs and services 420 and implement the fast control loop 320. The structured database 402 can receive data from the fast control loop 320 and the offline predictive analytics service 430 and provide input to a real-time analytics and control service 434, consumer apps and control interface 436, and a data exploration and presentation service 438.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for optimizing a distributed Wi-Fi network via a cloud based system using a plurality of control loops over multiple timescales, the method comprising:
 receiving and storing data measurements associated with operation of the distributed Wi-Fi network;

performing one or more of:
  a fast loop optimization of operating parameters associated with the distributed Wi-Fi network based on one or more first metrics and associated first thresholds; and
  a slow loop optimization of the operating parameters associated with the distributed Wi-Fi network based on one or more second metrics and associated second thresholds, wherein a timescale of the fast loop optimization is finer than a timescale of the slow loop optimization; and
providing the operating parameters to the distributed Wi-Fi network for configuration thereof;
wherein the slow loop optimization is performed with clustering the distributed Wi-Fi network with one or more Wi-Fi networks proximate thereto and the fast loop optimization is localized to one of the distributed Wi-Fi network or a cluster that is smaller than used for the slow loop optimization.

2. The method of claim 1, wherein the slow loop optimization is based on long term trends observed in the stored data measurement and the fast loop optimization is based on short term fluctuation observed in the received data measurements.

3. The method of claim 1, wherein the slow loop optimization is based on forecasts based on the stored data measurement of a plurality of traffic loads, capacities between access points, capacities between access points and clients, interference, and channel availability.

4. The method of claim 1, wherein the slow loop optimization provides output for the operating parameters in one of a single network configuration and a schedule of network configurations for use at different times.

5. The method of claim 1, wherein the fast loop optimization addresses conditions on timescales of seconds to minutes.

6. The method of claim 1, wherein the one or more first metrics is a different subset of the data measurements than the one or more second metrics.

7. The method of claim 1, wherein the providing for the slow loop optimization is performed when load in the distributed Wi-Fi network is low and wherein the providing for the fast loop optimization is performed after the fast loop optimization is performed.

8. The method of claim 1, wherein the first associated thresholds are different from the second associated thresholds.

9. A cloud based system configured to optimize and manage one or more distributed Wi-Fi networks using a plurality of control loops over multiple timescales, the cloud based system comprising:
  a network interface communicatively coupled to the one or more distributed Wi-Fi networks;
  one or more processors communicatively coupled to the network interface; and
  memory storing instructions that, when executed, cause the one or more processors to:
    receive and store data measurements associated with operation of the distributed Wi-Fi network;
    perform one or more of:
      a fast loop optimization of operating parameters associated with the distributed Wi-Fi network based on one or more first metrics and associated first thresholds; and
      a slow loop optimization of the operating parameters associated with the distributed Wi-Fi network based on one or more second metrics and associated second thresholds, wherein a timescale of the fast loop optimization is finer than a timescale of the slow loop optimization; and
    provide the operating parameters to the distributed Wi-Fi network for configuration thereof;
  wherein the slow loop optimization is performed with clustering the distributed Wi-Fi network with one or more Wi-Fi networks proximate thereto and the fast loop optimization is localized to one of the distributed Wi-Fi network or a cluster that is smaller than used for the slow loop optimization.

10. The cloud based system of claim 9, wherein the slow loop optimization is based on long term trends observed in the stored data measurement and the fast loop optimization is based on short term fluctuation observed in the received data measurements.

11. The cloud based system of claim 9, wherein the slow loop optimization is based on forecasts based on the stored data measurement of a plurality of traffic loads, capacities between access points, capacities between access points and clients, interference, and channel availability.

12. The cloud based system of claim 9, wherein the slow loop optimization provides output for the operating parameters in one of a single network configuration and a schedule of network configurations for use at different times.

13. The cloud based system of claim 9, wherein the fast loop optimization addresses conditions on timescales of seconds to minutes.

14. The cloud based system of claim 9, wherein the one or more first metrics is a different subset of the data measurements than the one or more second metrics.

15. The cloud based system of claim 9, wherein the operating parameters for the slow loop optimization are provided when load in the distributed Wi-Fi network is low and wherein the operating parameters for the fast loop optimization are provided after the fast loop optimization is performed.

16. The cloud based system of claim 9, wherein the first associated thresholds are different from the second associated thresholds.

17. A non-transitory computer readable medium storing instructions configured to perform an optimization of one or more distributed Wi-Fi networks using a plurality of control loops over multiple timescales, wherein the instructions, when executed, cause one or more processors to perform steps of:
  receiving and storing data measurements associated with operation of the distributed Wi-Fi network;
  performing one or more of:
    a fast loop optimization of operating parameters associated with the distributed Wi-Fi network based on one or more first metrics and associated first thresholds; and
    a slow loop optimization of the operating parameters associated with the distributed Wi-Fi network based on one or more second metrics and associated second thresholds, wherein a timescale of the fast loop optimization is finer than a timescale of the slow loop optimization; and
  providing the operating parameters to the distributed Wi-Fi network for configuration thereof;
  wherein the slow loop optimization is performed with clustering the distributed Wi-Fi network with one or more Wi-Fi networks proximate thereto and the fast loop optimization is localized to one of the distributed Wi-Fi network or a cluster that is smaller than used for the slow loop optimization.

18. The non-transitory computer readable medium of claim 17, wherein the slow loop optimization is based on long term trends observed in the stored data measurement and the fast loop optimization is based on short term fluctuation observed in the received data measurements.

* * * * *